:::

United States Patent [19]
Lalonde

[11] Patent Number: 5,844,230
[45] Date of Patent: *Dec. 1, 1998

[54] INFORMATION CARD

[76] Inventor: Michael G. Lalonde, 820 Newport Ter., Alpharetta, Ga. 30202

[ * ] Notice: The terminal 9 months of this patent has been disclaimed.

[21] Appl. No.: 422,224

[22] Filed: Apr. 14, 1995

Related U.S. Application Data

[63] Continuation-in-part of Ser. No. 105,344, Aug. 9, 1993, abandoned.

[51] Int. Cl.[6] .................................................. G06K 19/00
[52] U.S. Cl. .......................... 235/487; 235/493; 235/449; 283/904
[58] Field of Search ..................................... 235/493, 449, 235/487, 380, 448, 375, 379; 283/904, 107, 108, 114, 83

[56] References Cited

U.S. PATENT DOCUMENTS

| | | | |
|---|---|---|---|
| 4,066,873 | 1/1978 | Schatz | 235/487 |
| 4,443,027 | 4/1984 | McNeely et al. | 235/487 X |
| 4,593,936 | 6/1986 | Opel | 283/83 |
| 4,609,812 | 9/1986 | Drexler | 235/487 |
| 4,634,848 | 1/1987 | Shinohara et al. | 235/449 |
| 4,645,916 | 2/1987 | Raisleger | 235/449 X |
| 4,659,914 | 4/1987 | Kondo et al. | 235/380 |
| 4,806,740 | 2/1989 | Gold et al. | 235/449 |
| 5,440,108 | 8/1995 | Tran et al. | 235/380 X |

Primary Examiner—Donald T. Hajec
Assistant Examiner—Jeffrey R. Filipek

[57] ABSTRACT

An improved information card having a plurality of information sets on a single, single piece card. The information card is in one preferred embodiment a single, single piece, plate member which is operable to contain two discrete sets of embossed information such as for two credit card accounts, each on a separate section of one side of the card. The information card also preferably includes two magnetic strips on the reverse side of the card, which may preferably correspond to the two sets of embossed information. In the method of the present invention, a conventional sized plate member is embossed to form two discrete information sections, with the indentations in the rear of the embossed characters optionally filled with a suitable compound before affixing two magnetic strips on the reverse side of the plastic member. In an alternative embodiment, the information card is a composite of two bonded plate members, each having an embossed section and a magnetic strip. An alternative method utilizes two plate members, each member embossed on one side. A magnetic strip is affixed to the same side as the embossed characters, and the two plate members are thereafter adhesively bonded to form a composite information card. In yet another alternative embodiment, the information card is made from two plate members laminated together, each plate member having one or more magnetic strips located on one side, with a plurality of alphanumeric characters embossed directly over each magnetic strip. In yet another alternative embodiment, the information card and method for making includes sets of oppositely embossed projections upon a single plate member and corresponding magnetic strips on opposite sides of the plate member.

10 Claims, 5 Drawing Sheets

INFORMATION CARD

CROSS REFERENCE TO RELATED APPLICATIONS

This application is a continuation in part of application Ser. No. 105,344, IMPROVED INFORMATION CARD, filed by Michael Lalonde on Aug. 9, 1993 now abandoned.

BACKGROUND OF THE INVENTION

The present invention relates to an improved information card, and more specifically to a single, single piece card which can contain a plurality of credit card or account or other user information and which is readily useable in card reading equipment presently in use today.

In recent years, with the proliferation of magnetic strip cards and the like for credit card information, bank account information, twenty four hour money line withdrawals and the like, wallets and purses have been overwhelmed with cards for various accounts. Thus, there have been many attempts to utilize various devices for increasing the storage of information on a credit card or the like, such that less cards need to be carried by a person. Examples of some of these attempts are set forth in the following.

U.S. Pat. No. 4,443,027 to McNeely et al. discloses a multiple company credit card system wherein one or more miniaturized credit indicators are affixed to a wallet-sized primary plate (i.e. card material) bearing the name, signature, picture and account number of an authorized user. Each of the indicators are stated to represent a different credit account. The indicators are stated to be locked into recessed spaces on the face of the plate and each comprise either magnetic tapes, microprocessor chips or integrated circuits which provide identifying information. The apparent drawback of this system, however, is that some or all of the information on the plate does not appear to be decipherable without special reading and/or decoding equipment. Accordingly, it would appear that retail stores would have to be equipped with special de-coding equipment to be able to read all of the information contained on this form of credit card.

U.S. Pat. No. 4,634,848 to Shinahara et al. also discloses multiple credit card information on several magnetic strips. However, this patent also teaches special equipment for reading of the credit information, which makes such a configuration undesirable.

U.S. Pat. No. 4,593,936 to Opel discloses a universal credit card. The credit card allows a purchaser to make a credit purchase and select any one of a number of pre-established credit lines to charge the purchase to. The selected credit line is entered onto a charge slip in an array of dots imprinted on the charge slip from the credit card. Thus, this card would also require unique equipment for its use.

U.S. Pat. No. 4,609,812 to Drexler discloses a data storage card having spaced apart data strips. The data strips run parallel to the long side of the card. One strip is made from a reflective read-only optical memory material while the other strip is a magnetic recording material. Each of the two strips store data for use with complementary data in data bases.

U.S. Pat. No. 4,066,873 to Schatz further discloses an identification card system which includes a plastic card blank of a size and thickness in accordance with a conventional credit card. The card is stated to include a magnetic strip for providing magnetically encoded information in addition to one or more labels applied during or after fabrication of the card, where the labels have an omni-directionally rectilinear bar binary coded (UPC) information label applied to either the front or backside of the card. This allows scanning for banking or account information while checking out groceries or the like.

While many of these systems seem to reduce the number of cards in a user's portfolio, these devices all have the draw-back of requiring special equipment for reading or otherwise encoding or using the information contained on the cards. Thus, in order to utilize the teachings of each of these inventions, present day equipment would have to be replaced with new specialized equipment in order to use these cards. This is somewhat unlikely and would be incredibly expensive. Thus, such new improved systems are not readily available for use today. Therefore, it would be advantageous if multiple credit or account or other user information could be stored on a single card, which card would be readily useable with equipment commonly found in use today, throughout the United States and the world.

SUMMARY OF THE INVENTION

Thus, in accordance with the present invention there is provided an information card having a plurality of information such as credit card account or other user information on a single, single piece card which is useable on a conventional card processing apparatus. In one preferred embodiment, the card of the present invention includes a plate member which has a first side and a second side. A first set of embossed information, such as that characteristic of a first information set (such as a credit card account), may be disposed in a conventional raised fashion on either of the first side or the second side of the plate member. A first magnetic information media having information such as that corresponding to a first information set may also be positioned on either the first side or the second side of the information card. In this embodiment, the information card of the present invention may also preferably include at least a second set of embossed information on one of the sides and a second magnetic information media on the other of the sides whereby a plurality of credit card or account information may be included on the information card.

Alternatively, the first and second sets of embossed information and the first and second magnetic information media may be disposed in any combination upon the sides of the information card.

Also provided in the present invention is a method for production of such an information card wherein corresponding sets of embossed information and magnetic information media can be applied on the same side of the information card, or on opposite sides in an overlying or juxtaposed relation. Optionally, a filler material may be used to fill the rear side of the embossed characters, so as to provide a substantially flat surface for applying a magnetic information media.

In a further alternative, the magnetic strip could be programmed such that each strip could contain a second set of information, with the different information on the strip being readable by passing the strip through a reader in opposite directions.

In another embodiment of the method of the present invention, two plate members are provided with embossed information and magnetic information media, and are laminated together in a back-to-back relation, to provide a composite card having discrete sets of information, which may be in the form of any combination and relation of embossed information and magnetic information media.

In another embodiment of the present invention, embossed information is placed over magnetic strips on opposite sides of the center line of two separate thin card blanks and the blanks are secured back to back to provide four separate sets of information on single, single piece information cards.

In still another embodiment of the present invention, embossed projections arrange in specific patterns recognizable as alphanumeric characters arranged in a grid like pattern are provided on an information card. The projections are in multiple sets and extend from opposite sides of a single, single piece information card in an offset grid pattern so as not to interfere with each other while utilizing substantially the same overall area of the card. The projections are utilized with magnetic strips as with the other embodiments of the invention to provide an information card with multiple accounts on the same card, which card is useable with conventional card reading apparatus.

It is an object of the present invention to provide a card which is very simple and easily comprehensible by card holders, store owners, restaurant cashiers and the like, with very little thought. Thus, the present invention provides a card which is useable and identifiable by consumers or other users without hesitation, since its layout and use would be conventional and second nature.

It is therefore an object of the present invention to provide a credit card format which is readily useable in present day equipment and which may be manufactured at low cost. Credit cards made in accordance with the teachings of the present invention may include magnetic strips juxtaposed over embossed lettering without affecting the useability of the credit card.

Further benefits and advantages of the present invention will be understood by those skilled in the art with reference to the brief description of the drawings set forth below, detailed description of the preferred embodiments and the claims appended thereto.

DESCRIPTION OF THE PREFERRED EMBODIMENTS

Figure 1:
FIG. 1, is a front view of an information card made in accordance with the teachings of the present invention.

In accordance with the present invention, there is provided an improved information card, generally shown at 10. Card 10 may be useful as any type of card wherein a plurality of discrete sets of information are desired to be accessible from a single, single piece card. Thus, suitable uses include information sets such as personal user information for financial accounts, user identification accounts, credit accounts, hospital or other health information, insurance information, or various other combinations of these and other uses wherein a plurality of information may be located on a single card. In one preferred embodiment, the information card of the present invention includes a single plate member generally indicated at 12 which includes a first side shown in FIG. 1 at 14 and a second side generally shown in FIG. 12 at 16.

The first side 14 and the second side 16 are each preferably composed of discrete sections which may correspond to a plurality of information sources located upon the single piece card 10. Each section is preferably suitable for containing a discrete set of information. It will be appreciated that these sets of information may represent multiple independent sets of information, or may alternatively represent related sets of information in any combination. Because it is desirable for the card 10 to be compatible with present-day credit card reading machines, one set of information may preferable be in the form of a series of embossed alphanumeric characters, such as a name and an account number, located on one side of the card 10. Another related set of information may be in the form of a magnetic information media, such as a conventional magnetic strip, which includes the same and/or additional information, and is located on the reverse side of the card 10.

The card 10 in accordance with one preferred embodiment of the present invention includes on its first side 14 a first information section 18 and a second information section 20, preferably divided by a centerline "C—C". The first information section 18 preferably includes a first set of information 22 such as that characteristic of a first credit card account ("card 1"). The first set of information 22 includes standard credit card information in the dimensions within industry tolerances and is disposed upon the information card so as to be useful with current processing machines. Thus, the first set of information 22 includes alphanumeric characters such as an account number 24, the expiration date 26 and the identification of the cardholder 28. Additionally, indicia such as that showing the type of credit card account, such as Visa® or MasterCard®, may be set forth in a conventional location such as that shown at Box 30. Other types of information may also be included. This information is arranged such that a conventional slide processor device may be utilized for processing the information on a written credit slip. Thus, these alphanumeric characters are preferably raised characters which are embossed on the information card. This allows the information on the card 10 to be transferred in a conventional manner by a slide processor device onto a carbon copy receipt of the type commonly in use today.

Figure 2:
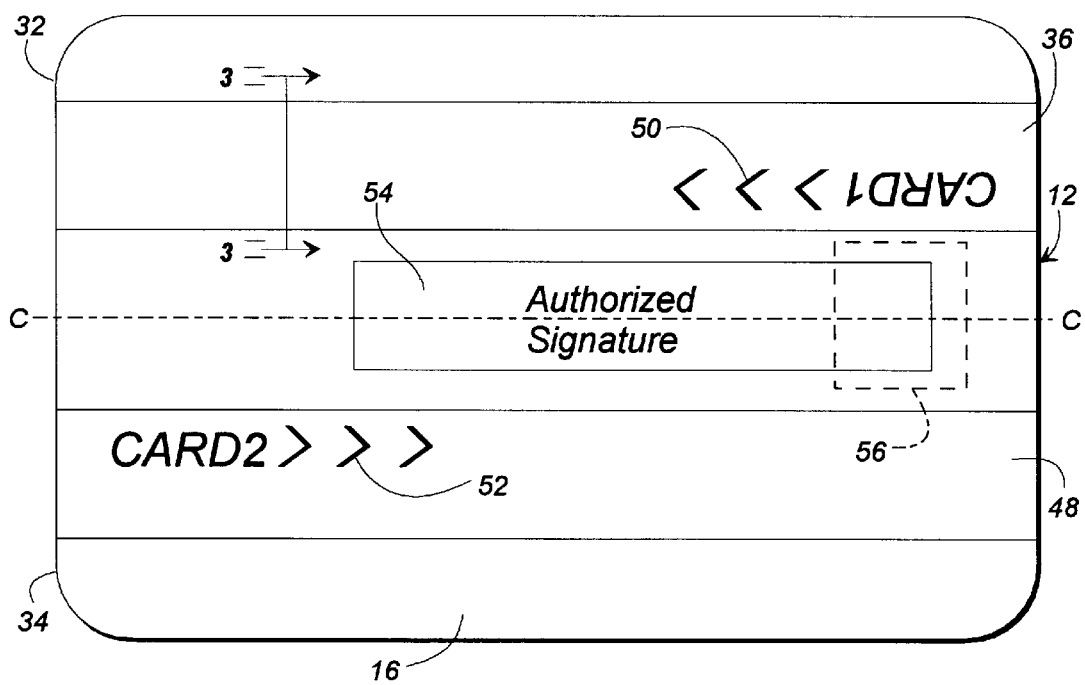
FIG. 2, is a rear view of the information card of FIG. 1.

Referring now to FIG. 2, which is a reverse view of the card 10 rotated upon the centerline "C—C", the second side 16 is shown to included a third information section 32 and a fourth information section 34, also preferably divided by the centerline "C—C". It will be noted that not all of the available space on either side of the centerline "C—C" on the first side 12 or the second side 14 need be utilized fox containing information. The third information section 32 preferably includes a first magnetic strip 36 which contains information corresponding to the "card 1" information 22 located on the first side 14 of the card 10. It is preferred that the first magnetic strip 36 be located in a directly reverse or overlying relationship to the first information section 18, so that all of the "card 1" information may be contained on both the first side 14 and the second side 16 in the same direction from the centerline "C—C". Alternatively, an opposite reverse or juxtaposed arrangement may be used, wherein the first magnetic strip 36 and the first information section 18 are on opposite sides of the centerline "C—C", as well as on opposing sides of the card 10. Thus, a conventional magnetic strip reader can be utilized to record or process the information from the first magnetic strip 36 in a conventional manner. It is important to note that card voucher machines typically in use today provide for positioning of a voucher over one half of a card side for the transfer of information on that one side, such as 18 or 32, onto the voucher. Thus, to avoid any read-through problem or the like, it is desirable to maintain the complete set of information on one side of the centerline "C—C".

Referring again to FIG. 1, the card 10 of the present invention also preferably includes on the second information section 20 a second set of information 38 such as that characteristic of a second credit card account ("card 2"). The second set of information 38 also includes the standard credit card information in the dimensions within industry tolerances, and is disposed upon the information card so as to be useful with current processing machines. Thus, the second set of information 38 includes alphanumeric characters such as an account number 40, the expiration date 42 and the identification of the cardholder 44. Additionally, an indicia such as that showing the type of credit card account may be set forth in a conventional location such as shown at box 46, in similar fashion as before. Other types of information may again also be included. As before, this information is arranged such that a conventional slide processor device may be utilized for processing the information on a written credit slip. Thus, these alphanumeric characters are also preferably raised characters which are embossed on the information card.

Referring again to FIG. 2, the second side 16 is also shown to include within the fourth information section 34 a corresponding second magnetic strip 48 having information corresponding to the "card 2" information located on the first side 14 of the card 10. In similar fashion to that previously set forth, it is preferred that the second magnetic strip 48 be located in a directly reverse relationship to the second information section 20, so that all of the "card 2" information may be contained on both the first side 14 and the second side 16 in the same direction from the centerline "C—C". Alternatively, an opposite reverse arrangement may be used, wherein the second magnetic strip 48 and the second information section 20 are on opposite sides of the centerline "C—C", as well as on opposing sides of the card 10. The first magnetic strip 36 and the second magnetic strip 48 may also preferably contain suitable indicia 50 and 52 for indicating the desired direction of movement over a magnetic card reader.

The card also includes provisions for an authorized signature 54 and an identification photograph 56, as may be desired.

Figure 3:
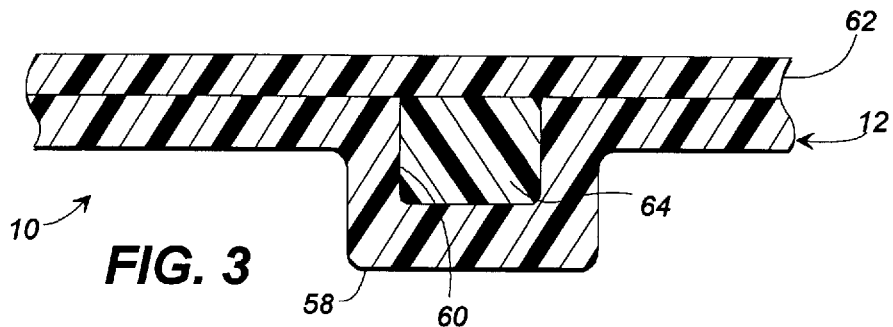
FIG. 3, is a sectional view of the information card of FIGS. 1 and 2, taken along the line 3—3 in FIG. 2 in the direction of the arrows and showing a layer of magnetic material and a filler material.

Because some card readers for magnetic strips and magnetic strips themselves may be sensitive to indentations which might be caused by overlapping of the embossing with the magnetic strips, special provisions are provided in the present invention to provide a flattened strip receiving portion for the magnetic strips, if desired. Referring now to FIG. 3, a first preferred modification of the present invention is shown wherein the plate member 12 includes an embossed character shown at 58. Because the embossed character 58 includes an indentation 60, it may be possible to provide a flat surface on the reverse side of the plate member 12 for a magnetic strip 62. In a preferred embodiment, this is provided by utilizing a filler composition 64 which may coat or fill a substantial portion of the indentations caused by embossing of the characters prior to attachment of the magnetic strip 62 to the information card 10. The filler composition 64 may be of any type of bondable compatible polymeric material or lacquer or the like which will fill the indentation 60 to the extent such that a magnetic strip 62 can be thereafter applied in a reverse relation to the embossed character 58 without affecting the flattened surface characteristics of the magnetic strip 62. This allows the magnetic strip 62 to be read by a standard card reader.

Figure 4:
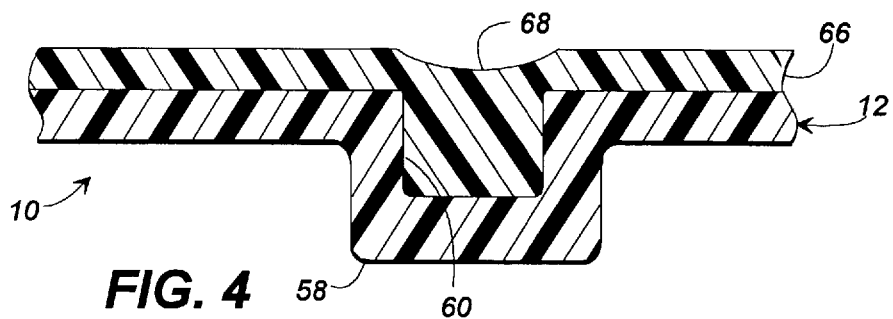
FIG. 4, is a sectional view similar to FIG. 3, showing an alternate embodiment of the present invention having a layer of magnetic material without filler material beneath.

In an alternate modification illustrated in FIG. 4, it has been found that a magnetic media may be applied by suitable adhesives or the like as a magnetic layer 66 over the indentation 60. In this method, there typically will be a recess 68 in the magnetic layer 66 where it overlies the indentation 60. However, it has been found that such a recess will not adversely affect the magnetic readability of the strip. Such a magnetic layer 60 could be applied early in the production process by utilizing a magnetic particle material intermingled with a curable polymer liquid or the like. This mixture could then be applied to the embossed card by conventional methods such as spray coating, brushing or squeegeeing.

There is also provided a method of the present invention describing the aspects of manufacturing such a card. A plate member 12 is provided and thereafter a plurality of alpha numerical characters 24, 26, 28, 40, 42 and 44 would be embossed therein by standard processing techniques. Thereafter the rear side indentations 60 would be filled with a suitable filler composition 64, such as a bondable compatible polymeric material or lacquer, by such methods as spray application, squeegee application or brush application. This application preferably creates a substantially level surface for attachment of a magnetic strip 62. After the identations 60 are filled, the magnetic strip 62 may thereafter be attached by conventional means such as adhesive application or the like. In an alternate modification of the method of the present invention, the application of the filler composition 64 is omitted, and the rear side indentations 60 are covered by a magnetic layer 66 applied by suitable adhesives or the like.

In the present invention, the magnetic strips could be programmed such that each strip could contain a second set of information, readable by passing the strip through a reader in the opposite direction. Thus, the current reading heads may be programmed to read every other symbol or character on the magnetic strips and the material on the strips synchronized so that different characters are read when the card is moved through the reader in opposite directions.

Figure 5:
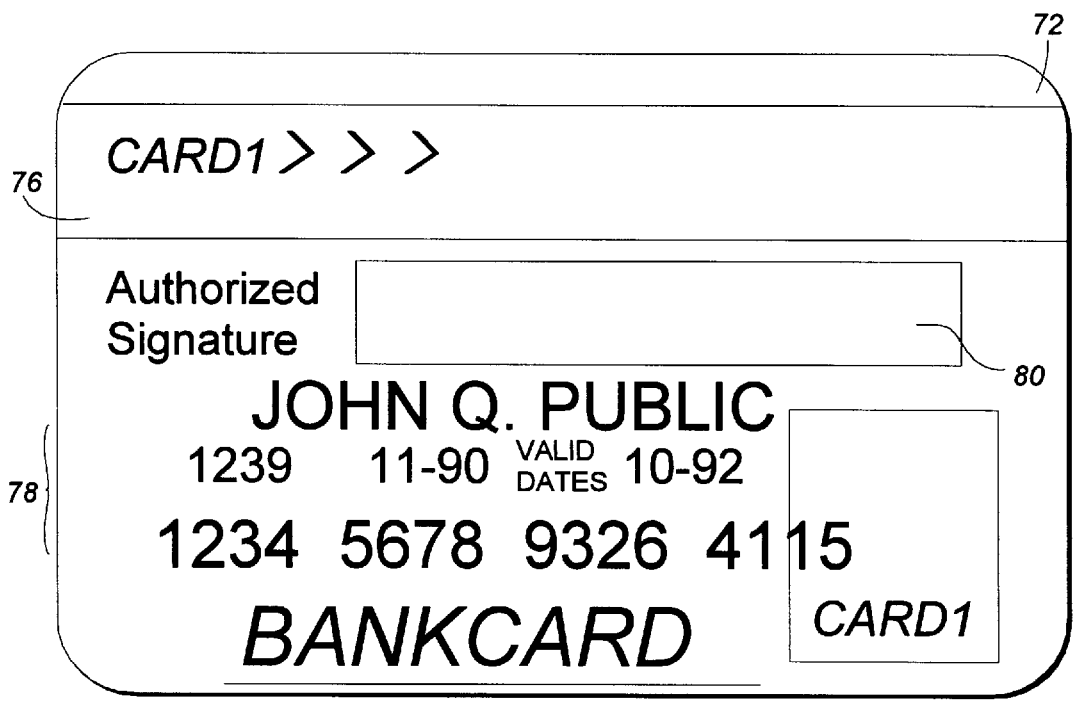
FIG. 5, is a front view of an alternate embodiment of the information card made in accordance with the teachings of the present invention.
Figure 6:
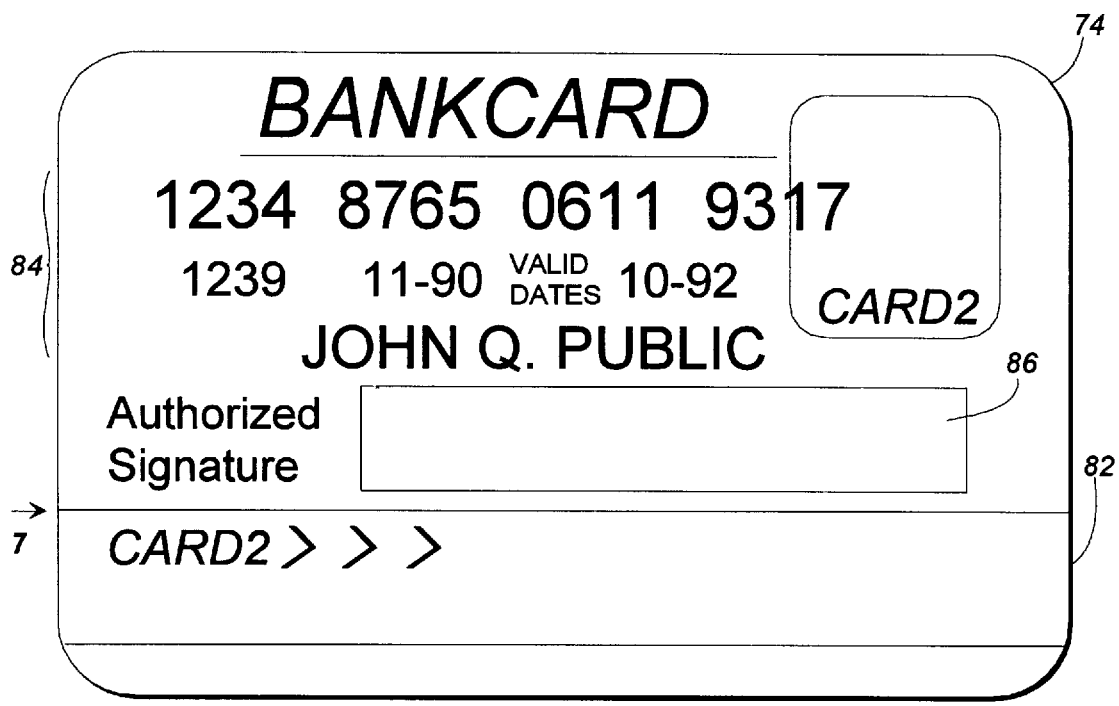
FIG. 6, is a rear view of the information card of FIG. 5.
Figure 7:
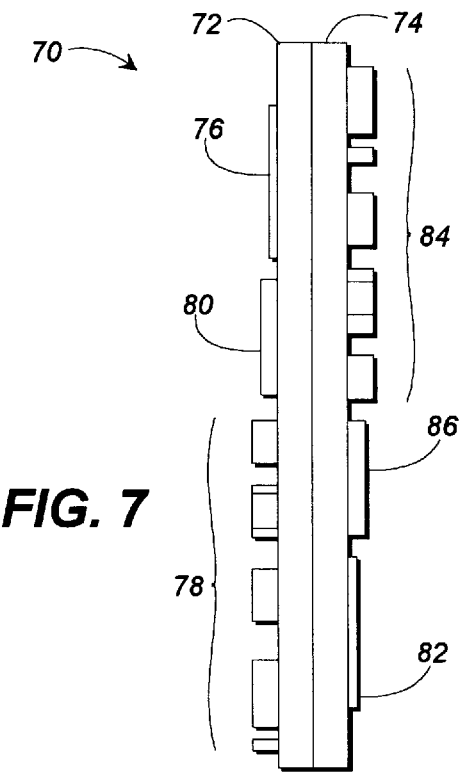
FIG. 7, is an enlarged end view of the information card of FIGS. 5 and 6, taken in the direction of arrow 7 in FIG. 7.

Referring now to FIGS. 5, 6 and 7, there is provided an alternate embodiment of an information card 70 produced in accordance with the teachings of the present invention. In this alternate embodiment, a first card member 72 and a second card member 74 are laminated together by suitable adhesives or the like to form a single piece multiple use information card 70 of the present invention. The first card member 72 includes a magnetic strip 76, a first information section 78 and a first authorized signature space 80. The second card member 74 includes a second magnetic strip 82, a second information section 84 and a second authorized signature space 86. It will be appreciated that the first information section 78 and the second information section 84 may contain the same or other types of information as that described in connection with FIGS. 1 & 2. Thus, the two separate sets of information may be contained on the first and second card members 72 and 74 which are manufactured separately utilizing commonly known processes. After manufacture of the information cards, the cards are laminated together by suitable adhesives or the like as shown by FIG. 7 to produce a single piece, multiple use information card 70 having information useful for multiple purposes, such as for multiple credit account information, on a single card. Thus, utilizing the teachings of the present invention, an information card is provided which is readily utilized in conventional card processing apparatus but which contains a plurality of information on a single, single piece card.

As will be readily appreciated by those skilled in the art, the card of the present invention may be produced with various combinations of information and magnetic strips other than that shown. Thus, the cards of FIGS. 5, 6 and 7 could be configured similar to that shown in FIGS. 1–2 or vice versa and also magnetic strips could be placed in different locations on the card providing the methods of the present invention as utilized are set forth herein. It will also be appreciated that in each of the embodiments described above, different types of information, including embossed characters, magnetic strips and other forms of information may be included in any combination and on any combination of information sections. Thus, the information card of the present invention may be suitable for providing several types of information over various locations of the card surfaces.

Figure 8:
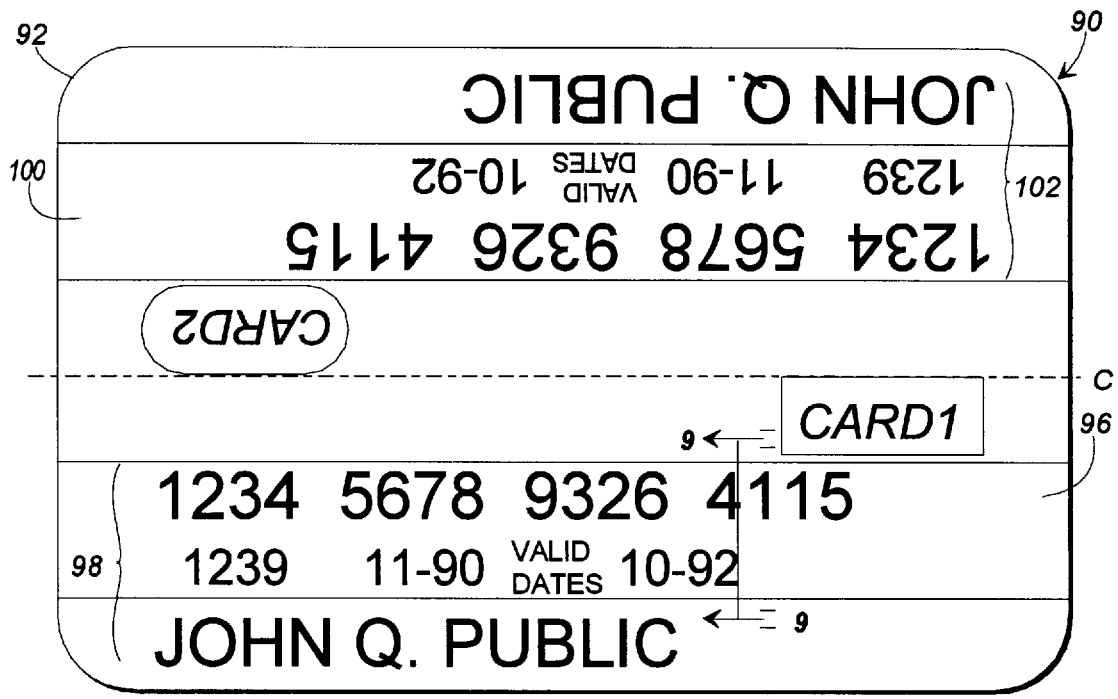
FIG. 8, is a front view of an alternate embodiment of an information card of the present invention, wherein information is embossed directly over a plurality of magnetic strips.
Figure 9:
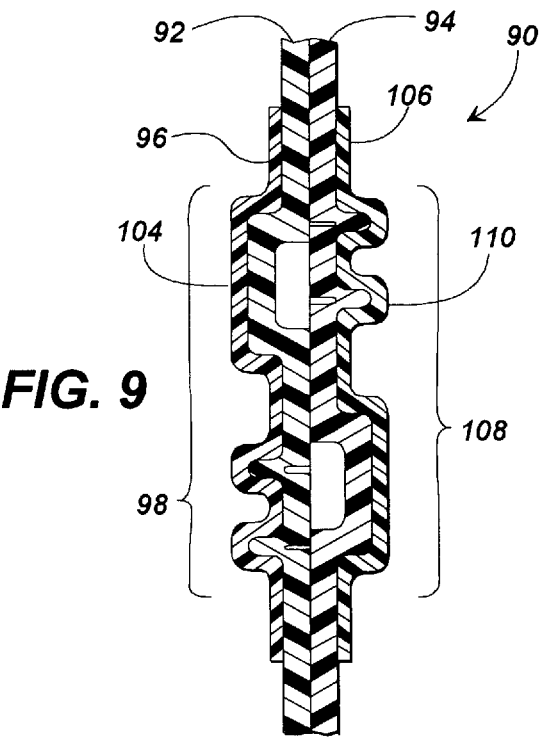
FIG. 9, is a cross-sectional view of a portion of the information card of FIG. 8, taken substantially on line 9—9 in FIG. 8 and illustrating a two piece laminated card.

Referring now to FIGS. 8 and 9, there is provided an alternate embodiment of an information card 90 produced in accordance with the teachings of the present invention. In this alternate embodiment, a first card member 92 and a second card member 94 are laminated together by suitable adhesives or the like to form a multiple use information card 90 of the present invention. The first card member 92 includes a first magnetic strip 96 and a first information section 98, which includes similar information to that previously set forth. The first magnetic strip 96 and the first information section 98 correspond to a first set of information which may be information for a first credit card account or the like.

The first card member 92 also includes a second magnetic strip 100 and a second information section 102, which correspond to a second set of information, such as for a second credit card account, or the like. In this embodiment, the first magnetic strip 96 and the first information section 98, as well as the second magnetic strip 100 and the second information section 102, preferably overlie each other, such that each set of information may be contained on a separate side of the centerline C—C, which divides the two information sections of the first card member 92, in similar manner to that previously set forth. As such, the information embossed into the first information section 98 may preferably be embossed in part or in whole directly upon the first magnetic strip 96. Likewise, the information embossed into the second information section 102 may preferably be embossed in part or in whole directly upon the second magnetic strip 100. It is believed that the imprint of the embossed characters upon a magnetic strip will not disturb the magnetic reader from receiving its information as it is normally done, even though the embossed letters or numbers are formed in the magnetic strip. This is in contradiction to the teachings of conventional cards wherein the magnetic strip is not known to overlie the embossed portion of the card.

In this embodiment, as shown in FIG. 9, it is possible to laminate two information cards together through the use of a suitable adhesive or the like to produce an information card capable of including a plurality of discrete sets of information, each set of information having a magnetic strip with embossed characters thereupon. Preferably, the information card will contain four discrete sets of information, through the utilization of each half of the composite single piece card.

Referring now to FIG. 9, FIG. 9 illustrates a cross-sectional view of a portion of an information card having a first card member 92 and a second card member 94 laminated together back side to back side, with overlying sections of magnetic strips each having embossed characters disposed thereon. In this illustration, the first magnetic strip 96 is shown to include a plurality of embossed characters 104 disposed within the first information section 98. In similar manner, the second information card 94 is shown to include a second magnetic strip 106 and a second information section 108 having a plurality of embossed characters 110 disposed thereon. It will be appreciated that in different embodiments, the corresponding information sections and/or magnetic strips need not be directly symmetrical to each other, and that the embossed characters and magnetic strips may vary in location and orientation among different uses.

It is to be appreciated that the first card member 92 and the second card member 94 could be made of a reinforced plastic material which have, for instance, reinforcement fibers aligned longitudinally on one of the cards and are aligned laterally on the other card. This would provide a structurally improved card upon lamination. Thus, the card member could be produced thin enough such that even upon lamination, the resulting card would be as thin or thinner than conventional cards.

The method of the present invention thus also includes the aspects of manufacturing such a card as described above. In this embodiment, a first card member 92 is provided upon which is attached at least one, and optionally a plurality, preferably two, magnetic strips, disposed in a relation such as that shown by magnetic strips 96 and 100. A plurality of embossed characters such as those shown at 104, may preferably be embossed upon the magnetic strips 96 and 100, so as to provide a first information section 98 and a second information section 102. In similar manner, a second card member 94 is provided upon which is attached one or more magnetic strips, such as 106, in similar fashion to the first card member 92. A plurality of embossed characters, such as 110, are embossed directly upon each magnetic strip, such as 106, of the second card member 94, therefore providing another plurality of information sets, and preferably two information sets. The first card member 92 and the second card member 94 may then be bonded together by suitable adhesives or the like to form an information card having a plurality of discrete sets of information.

Figure 10:
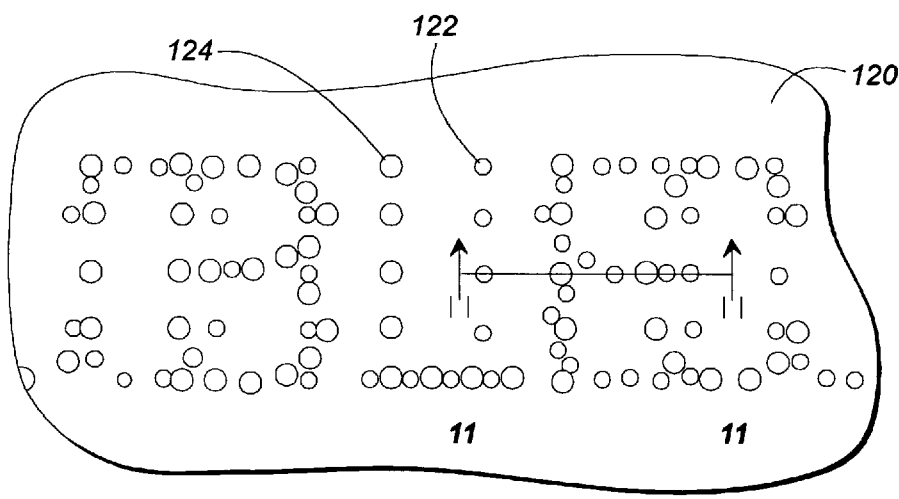
FIG. 10, is a front view of a portion of an information card of the present invention, wherein oppositely embossed projections form discrete sets of information on opposite sides of a single card member
Figure 11:
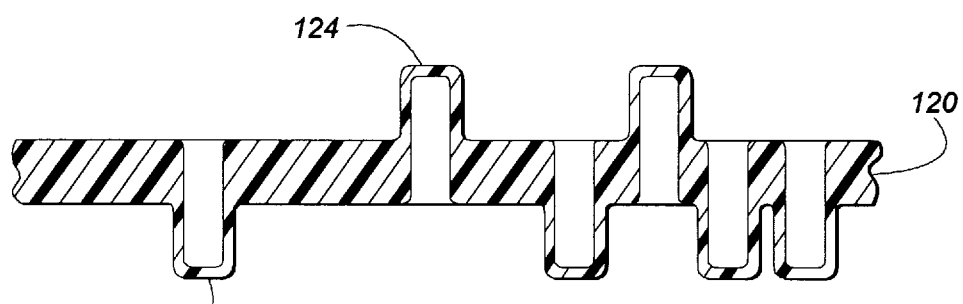
' and FIG. 11, is a cross-sectional view of a portion of the information card illustrated in FIG. 10, taken substantially on line 11—11 in FIG. 10.

Yet another embodiment of the present invention is described with references to FIGS. 10 and 11. More specifically, FIG. 10 illustrates a portion of an information card 120 of similar type to the information cards previously described. In this embodiment, the information card 120 is suitable for containing embossed information on both sides of a single, single piece card blank. This is accomplished by the utilization of a series of embossed dots or projections, disposed adjacent to each other, but arranged in specific patterns and preferably in substantially opposite directions upon the information card 120 in an offset grid like setting. In a preferred embodiment, the offset grid-like spacing is provided by discrete dot matrix patterns that are non-overlapping between sides of the information card 120. The information card 120 includes a series of raised projections 122, which project in an upward direction on one side of the card. These projections 122 are arranged so as to be recognizable alphanumeric characters when analyzed as related units. The information card 120 further includes a series of indented projections 124 which are indented into one side of the card, so as to appear as raised dots or projections upon the opposite side of the information card 120.

In similar manner to the raised projections 122, the endented projections 124 are arranged in a grid-like fashion so as to form recognizable alphanumeric characters when analyzed in related groups. In order to provide discrete locations for the raised projections 122 and the indented projections 124, an offset grid system is provided, wherein the raised projections 122 are offset by one-half space from the indented projections 124 in at least one direction across the information card 120. In alternative embodiments, the raised projections 122 and the indented projections 124 may be offset vertically, horizontally, or in combinations of both directions. In the embodiment shown in FIG. 11, the offset between the raised projections 122 and the indented portions 124 is provided in the horizontal direction, although it will be appreciated that the offset can be provided in a vertical direction across the information card 120 as well. As such, it will be appreciated that any suitable offset relation combination may be utilized for distinguishing the locations of the raised projections 122 and the indented projections 124. Therefore, in this embodiment, each side of the information card 120 may preferably include at least one, and optionally a plurality, of separate series of embossed alphanumeric characters, each of which are made up of a series of dots or projections upon each side of the information card 120. With this arrangement, it is possible to include discrete sets of embossed information directly opposite each other on a single card, each set of information conveniently recognizable to a card processing apparatus from only one side. Because a plurality of information sets can be located on a single card member, this reduces the thickness and weight of the information card being carried.

Such a configuration would allow for a series of dot imprintations in the form of readable alphanumeric characters, to be produced on a carbon copy of charge receipts or the like. This is accomplished using conventional credit card type processing equipment.

It will be appreciated that this embodiment may be utilized in connection with the characteristics set forth in FIG. 9, wherein a plurality of discrete sets of information are provided on a single card, with a plurality of magnetic strips applied to the information card in an overlying relation, as well as in an opposite relation across the centerline C—C of a single side. Referring now to FIG. 11, FIG. 11 illustrates a cross-sectional view of a portion of the information card illustrated in FIG. 10. This illustration demonstrates the relative disposition of the raised projections 122 and the indented projections 124 upon the information card 120, wherein each set of projections are recognizable from the separate sides of the card.

As such, there is also provided an additional method of the present invention describing the aspects of manufacturing this embodiment of card. A card member 120 is provided and a series of raised projections 122 and indented projections 124 are made by suitable equipment in a predetermined offset grid-like relation to yield an information card 120 having a plurality of discrete information sets embossed thereon on each side of the information card 120. This can be accomplished by providing a card blank produced of a thermoplastic material. A computer controlled laser could be situated such that it would emit a finite beam unto the card at each dot where necessary, to form the parts of the alphanumeric character. On the opposite side of the card from the laser projection, a vacuum is drawn such that as the beam softens the plastic, a protrusion is formed at each selected location until a series of projections form a letter or the like. The opposite side could be formed in a similar manner such that embossed information is provided on both sides of the card from a single, single piece card blank. In order to assure that the patterns do not overlap, dot matrix patterns could be utilized wherein a first dot matrix scheme is used on a first side of the card, to produce the first set of alphanumeric characters. Thereafter, the card or the matrix pattern could be offset on the opposite side to produce a second set of information which would not conflict or overlap with the first set of information. Thus, each set of information is produced from a non-overlapping dot matrix pattern with respect to the position on the card.

The information sets produced are recognizable as separate series of alphanumeric characters upon each side of the card 120 when the projections are related in groups. Optionally, a plurality of magnetic strips are applied to both sides of the information card 120, preferably in an overlying relation, before the embossing takes place, with the embossing being accomplished either in whole or in part directly upon the magnetic strips. The magnetic strips may thereafter be encoded by suitable methods to yield an improved information card having a plurality of discrete sets of information.

While the above description constitutes the preferred embodiments of the present invention, it is to be understood that the invention is susceptible to modification, variation and change without departing from the proper scope and fair meaning of the accompanying claims.

What is claimed is:

1. A single piece information card having a plurality of discrete information on a single card piece and useable on a conventional card reading apparatus comprising:

a single plate member including a first side and a second side;

a first set of embossed information characteristic of a first information set disposed on one of said first side and said second side of said single plate member;

a first magnetic information media having information corresponding to said first information set disposed on one of said first side and said second side of said single plate member;

at least a second set of embossed information characteristic of a second information set disposed on one of said first side and said second side of said single plate member; and at least a second magnetic information media having information corresponding to said second information set disposed on one of said first side and said second side of said single plate member;

said information being so placed and related;

said first set of embossed information and said information corresponding to said first set of embossed information being readable by the conventional card reading apparatus on the passing the single piece information card through the conventional card reading apparatus only with the single piece information card in a first orientation with respect to the card reading apparatus; and said second set of embossed information and said information corresponding to said second set of embossed information being readable by the conventional card reading apparatus on passing the single piece information card through the conventional card reading apparatus only with the single piece information card in a second orientation with respect to the card reading apparatus.

2. The information card of claim 1 wherein said first magnetic information media and said second magnetic information media are a first magnetic strip and a second magnetic strip.

3. The information card of claim 1 wherein said first set of embossed information and said second set of embossed information are on said first side and said first magnetic information media and said second magnetic information media are on said second side.

4. The information card of claim 1 wherein said first set of embossed information on said first side overlies said first magnetic information media on said second side and said second set of embossed information on said first side overlies said second magnetic information media on said second side.

5. The information card of claim 1 wherein said first set of embossed information on said first side overlies second magnetic information media on said second side and said second set of embossed information on said first side overlies said first magnetic information media on said second side.

6. The information card of claim 1 wherein said first set of embossed information on said first side overlies said second set of embossed information on said second side.

7. The information card of claim 1 wherein at least one of said first set of embossed information and said second set of embossed information includes a recess, said recess substantially filled by a filler material.

8. The information card of claim 1 wherein at least one of said first set of embossed information and said second set of embossed information is disposed upon one of said first magnetic information media and said second magnetic information media.

9. The information card of claim 1 wherein said first set of embossed information is disposed upon said first magnetic information media and said second set of embossed information is disposed upon said second magnetic information media.

10. The information card of claim 1 wherein at least one of said first magnetic information media and said second magnetic information media contains two sets of information, each set of information readable by a card reading apparatus by passing the information card through the card reading apparatus in different directions.

* * * * *